United States Patent
Zhou et al.

(10) Patent No.: US 8,938,197 B2
(45) Date of Patent: Jan. 20, 2015

(54) BASE STATION AIDED MOBILE-RELAY CANDIDATE PRE-SELECTION AND PRE-DEPLOYMENT

(75) Inventors: Bin Zhou, Shanghai (CN); Jing Xu, Shanghai (CN); Haifeng Wang, Shanghai (CN); Zhenhong Li, Shanghai (CN)

(73) Assignee: Nokia Corporation, Espoo (FI)

( * ) Notice: Subject to any disclaimer, the term of this patent is extended or adjusted under 35 U.S.C. 154(b) by 302 days.

(21) Appl. No.: 13/578,753

(22) PCT Filed: Feb. 26, 2010

(86) PCT No.: PCT/CN2010/070769
§ 371 (c)(1),
(2), (4) Date: Aug. 13, 2012

(87) PCT Pub. No.: WO2011/103719
PCT Pub. Date: Sep. 1, 2011

(65) Prior Publication Data
US 2012/0315841 A1  Dec. 13, 2012

(51) Int. Cl.
*H04B 7/185* (2006.01)
*H04B 7/26* (2006.01)
(Continued)

(52) U.S. Cl.
CPC .......... *H04B 7/2606* (2013.01); *H04B 7/15507* (2013.01); *H04W 76/023* (2013.01); *H04W 88/04* (2013.01)
USPC ...................... 455/13.1; 455/452.2

(58) Field of Classification Search
CPC .................................................. H04W 88/04
USPC .............. 455/436, 67.11, 13.1; 370/335, 280
See application file for complete search history.

(56) References Cited

U.S. PATENT DOCUMENTS

| 6,842,460 B1* | 1/2005 | Olkkonen et al. ............ 370/465 |
| 2002/0051425 A1 | 5/2002 | Larsson |

(Continued)

FOREIGN PATENT DOCUMENTS

| CN | 1471776 A | 1/2004 |
| CN | 1984462 A | 6/2007 |

(Continued)

OTHER PUBLICATIONS

Extended European Search Report received for corresponding European Patent Application No. 10846342.3, dated Jan. 7, 2014, 10 pages.
Office action received for corresponding Indonesian Patent Application No. W00201203390, dated Mar. 20, 2014, 1 page of office action and 1 page of office action translation.

(Continued)

*Primary Examiner* — Tu X Nguyen
(74) *Attorney, Agent, or Firm* — Harrington & Smith

(57) ABSTRACT

In one exemplary embodiment a network node (such as a base station BS) determines that a plurality of user equipments UEs are available for use as mobile relays MRs, and selects a subset of the plurality of UEs and configures the subset of the plurality of UEs as MRs. In another exemplary embodiment, an indication is sent (for example from a UE) that a UE is willing to operate as a MR, a response is received that the UE is selected to be a MR1 and then periodically there is sent a beacon advertising that the UE is a MR. In this manner UEs are pre-configured in a cell as MRs, regardless of any specific UE need for relay services. Any UE later needing relay service listens for the beacon. The BS can limit which UEs it pre-configures as MRs to avoid closely spaced UEs being both active MRs. Locations need not be signaled.

17 Claims, 7 Drawing Sheets

MR candidate willingness indicator

MR candidate selection

MR-SCH broadcast by MR candidates

RUE selection of MR candidate for relay

(51) Int. Cl.
*H04B 7/155* (2006.01)
*H04W 76/02* (2009.01)
*H04W 88/04* (2009.01)

(56) References Cited

U.S. PATENT DOCUMENTS

2007/0280172 A1* 12/2007 Tan et al. ............... 370/335
2010/0167743 A1* 7/2010 Palanki et al. ............ 455/436

FOREIGN PATENT DOCUMENTS

| | | |
|---|---|---|
| CN | 101039526 A | 9/2007 |
| CN | 101291167 A | 10/2008 |
| CN | 101523945 A | 9/2009 |
| EP | 1804441 A1 | 7/2007 |
| GB | 2346511 B | 5/2003 |
| WO | 2008/015562 A2 | 2/2008 |

OTHER PUBLICATIONS

Mans, "Approximation Algorithms for Multi-Point Relay Selection in Mobile Wireless Networks", INRIA, No. 4925, Sep. 2003, 22 pages.

"Discussion of Relay Mobility", 3GPP TSG RAN WG2 #67, R2-094679, Agenda Item: 7.4, ZTE, Aug. 24-28, 2009, pp. 1-6.

"Mobile Relay Support Analysis", 3GPP TSG RAN WG3 #65, R3-091778, Agenda Item: 13.1.2.4, Huawei, Aug. 24-28, 2009, 5 pages.

"Discussion of Relay Mobility", 3GPP TSG RAN WG3 #65, R3-091898, Agenda Item: 13.1.2.4, ZTE, Aug. 24-28, 2009, pp. 1-6.

International Search Report and Written Opinion received for corresponding International Patent Application No. PCT/CN2010/070769, dated Dec. 9, 2010, 10 pages.

Office action received for corresponding Chinese Patent Application No. 201080064289.3, dated Jul. 1, 2014, 10 pages of Office Action, No English Language Translation available.

* cited by examiner

BASE STATION AIDED MOBILE-RELAY CANDIDATE PRE-SELECTION AND PRE-DEPLOYMENT

RELATED APPLICATION

This application was originally filed as PCT Application No. PCT/CN2010/070769 filed Feb. 26, 2010.

TECHNICAL FIELD

The exemplary and non-limiting embodiments of this invention relate generally to wireless communication systems, methods, devices and computer programs and, more specifically, relate to mobile user terminals being used as relay stations within a wireless network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Relay techniques have been intensively studied for the 3G/Beyond 3G/4G networks. A cell's coverage may be extended, for example to a further geographic reach or to provide coverage to areas which are 'dead zones' to the network base station, by using one or more Relay Nodes RNs to pass communications between the network base station BS and the end point user equipment UE. The relay nodes may be fixed or mobile, and some mobile relay nodes may be UEs which are not owned or operated by the radio network. For future wireless systems it is hoped that most if not all UEs can make themselves available from time to time for use as a mobile RN.

By employing advanced relaying techniques on the fixed and the movable RNs, the coverage area and/or the throughput of the networks could be enlarged. Compared with the fixed relay, the deployment for mobile relay deployment is much cheaper, faster and more flexible. For these reasons, mobile relay enhanced cellular networks is becoming a promising concept which has attracted more and more attention from both industry and academia.

Typically, in the prior art the relay selection is done for each relay link separately. The following three references illustrate that general prior art trend.

GB2346511 "COMMUNICATION SYSTEM USING MOBILE REPEATERS". In this reference a cellular network finds a virtual routing path connecting BS and a certain UE via some MRs (Mobile Relays).

CN1984462A "WIRELESS NETWORK SYSTEM, ITS SWITCHING METHOD AND MOBILE STATION-TRANSFERRING EQUIPMENT". This reference describes in a general way that terminals can access a BS via MR under a radio self-networking mode.

"APPROXIMATION ALGORITHMS FOR MULTI-POINT RELAY SELECTION IN MOBILE WIRELESS NETWORKS" (by Bernard Mans, Institut National de Recherche en Informatique et en Automatique, No 4925, September 2003; ISSN 0249-6399). This paper describes a source code that multiple neighbor nodes as its relay nodes (MPRs set) in order to find proper routing for a certain remote node (destination node). The inventors understand this paper to be an extension from a one-relay-node case as in reference GB2346511 to a multiple-relay-node case. In this paper, for every MPRs selection algorithm, the source node should know the set of its neighbors' neighbors, denoted as $N^2(u)$. This then appears as a routing solution since the algorithm selects the MPR from knowledge of the source and destination nodes.

A conventional scheme for pairing a MR to a Relay UE RUE is illustrated in FIG. 1. The term RUE is used to distinguish that particular UE which is the end-point of the relayed communication from other UEs which are not using a relay. FIG. 1 breaks the task of UE/MR role changing and MR-RUE pairing into five distinct steps each at different panels of FIG. 1. At panel 1 of FIG. 1 the RUE which is experiencing a bad channel sends some type of help request to the base station BS via some cellular uplink, which is a request for relay (if available).

At panel 2 of FIG. 1, once the BS successfully receives the help request from the RUE, the BS then: schedules some radio resource for RUE probing purposes; "wakes up" some IDLE user terminals such as via some paging channel and inform these terminals of the assigned resource for receiving the probing signal that the RUE will soon send (for clarity these user terminals A through D that have been awakened by the BS are termed here as MR candidates); and informs the RUE via downlink signaling of the assigned radio resource for sending the probing signal.

At panel 3 of FIG. 1 the RUE sends the probing signal over the assigned resource, and all the UEs (terminals A through D) which are willing to be a MR listen to the probing signal. At panel 4, all the MRs report the MR-RUE channel measurement results to the BS for a centralized decision for relaying. Then at panel 5 of FIG. 1 the BS makes the decision, based on the channel measurement reports, on which MR is to be paired with the RUE. The BS then informs the corresponding MR and the RUE of its pairing decision via downlink signaling. The pairing of the RUE in FIG. 1 is with MR terminal C which indicates a single hop relay.

Although the aforementioned conventional scheme gives a straightforward and feasible solution to UE/MR role changing and MR-RUE pairing, the inventors have identified the following issues:

RUE's "help" request does not reach the BS. In this case, such as for example if the RUE is located at "blind area" or too far away from the BS, the entire process of FIG. 1 cannot go forward.

Selection of MRs. Signaling all the UEs in the cell to receive RUE probing would be quite high signaling overhead, whereas if only a fixed number of UEs were selected randomly to be MR-candidates there is no guarantee that the channel between the RUE and any MR-candidate is good enough and so a successful pairing of RUE with MR cannot be assured with high probability. Choosing only those UEs that are close to the RUE as the MR-candidates means the BS must have fairly exact location/geography information of all the UEs (including UEs in IDLE mode), which would require GPS-equipped UEs report location information to the BS which also increases signaling overhead (and additionally geographic location does not always accurately reflect channel propagation in an urban environment where mobile RN use would be most likely).

MR candidate is unwilling. If for example the BS awakens five IDLE user terminals to be MR candidates in accordance with a RUE request, but three of them are unwilling to act as an MR (for example, due to low battery power), then the MR-RUE pairing procedure may fail when for example the remaining two MR candidates do not have a good enough channel quality with the RUE. In this case also the conventional scheme of FIG. 1 cannot assure a viable MR-RUE link even if the RUE finds a suitable MR candidate.

SUMMARY

The foregoing and other problems are overcome, and other advantages are realized, by the use of the exemplary embodiments of this invention.

In a first aspect thereof the exemplary embodiments of this invention provide a method, comprising: determining that a plurality of user equipments are available for use as mobile relays; and selecting a subset of the plurality of user equipments and configuring the subset of the plurality of user equipments as mobile relays.

In a second aspect thereof the exemplary embodiments of this invention provide an apparatus comprising at least one processor and at least one memory storing a program of computer executable instructions. Te at least one processor is configured with the at least one memory and the computer executable instructions to cause the apparatus to perform actions comprising: determining that a plurality of user equipments are available for use as mobile relays; and selecting a subset of the plurality of user equipments and configuring the subset of the plurality of user equipments as mobile relays.

In a third aspect thereof the exemplary embodiments of this invention provide a computer readable memory storing a program of computer instructions that when executed by a processor result in actions comprising: determining that a plurality of user equipments are available for use as mobile relays; and selecting a subset of the plurality of user equipments and configuring the subset of the plurality of user equipments as mobile relays.

In a fourth aspect thereof the exemplary embodiments of this invention provide a method, comprising: sending an indication that a user equipment is willing to operate as a mobile relay; receiving a response that the user equipment is selected to be a mobile relay; and periodically sending a beacon advertising that the user equipment is a mobile relay.

In a fifth aspect thereof the exemplary embodiments of this invention provide an apparatus comprising at least one processor and at least one memory storing a program of computer executable instructions. The at least one processor is configured with the at least one memory and the computer executable instructions to cause the apparatus to perform actions comprising: sending an indication that a user equipment is willing to operate as a mobile relay; receiving a response that the user equipment is selected to be a mobile relay; and periodically sending a beacon advertising that the user equipment is a mobile relay.

In a sixth aspect thereof the exemplary embodiments of this invention provide a computer readable memory storing a program of computer instructions that when executed by a processor result in actions comprising: sending an indication that a user equipment is willing to operate as a mobile relay; receiving a response that the user equipment is selected to be a mobile relay; and periodically sending a beacon advertising that the user equipment is a mobile relay.

DETAILED DESCRIPTION

Various of the exemplary embodiments detailed below address one or more of the following issues which the inventors find are not fully satisfied by the conventional approach summarized at FIG. 1. Embodiments of the invention detailed below better address a mobile terminal shifting function as between a normal cellular user or RUE and a mobile relay. Unlike the conventional approach of FIG. 1 in which the wireless network determines RUE/MR pairing based on some path selection criteria and/or algorithm, these exemplary embodiments do not employ a directed pairing approach and so additionally address how the RUE finds a MR that is suitable for relaying its traffic. As will be seen the exemplary embodiments also impose certain efficiencies so as to keep signaling overhead manageable and the relaying process efficient.

Figure 1:
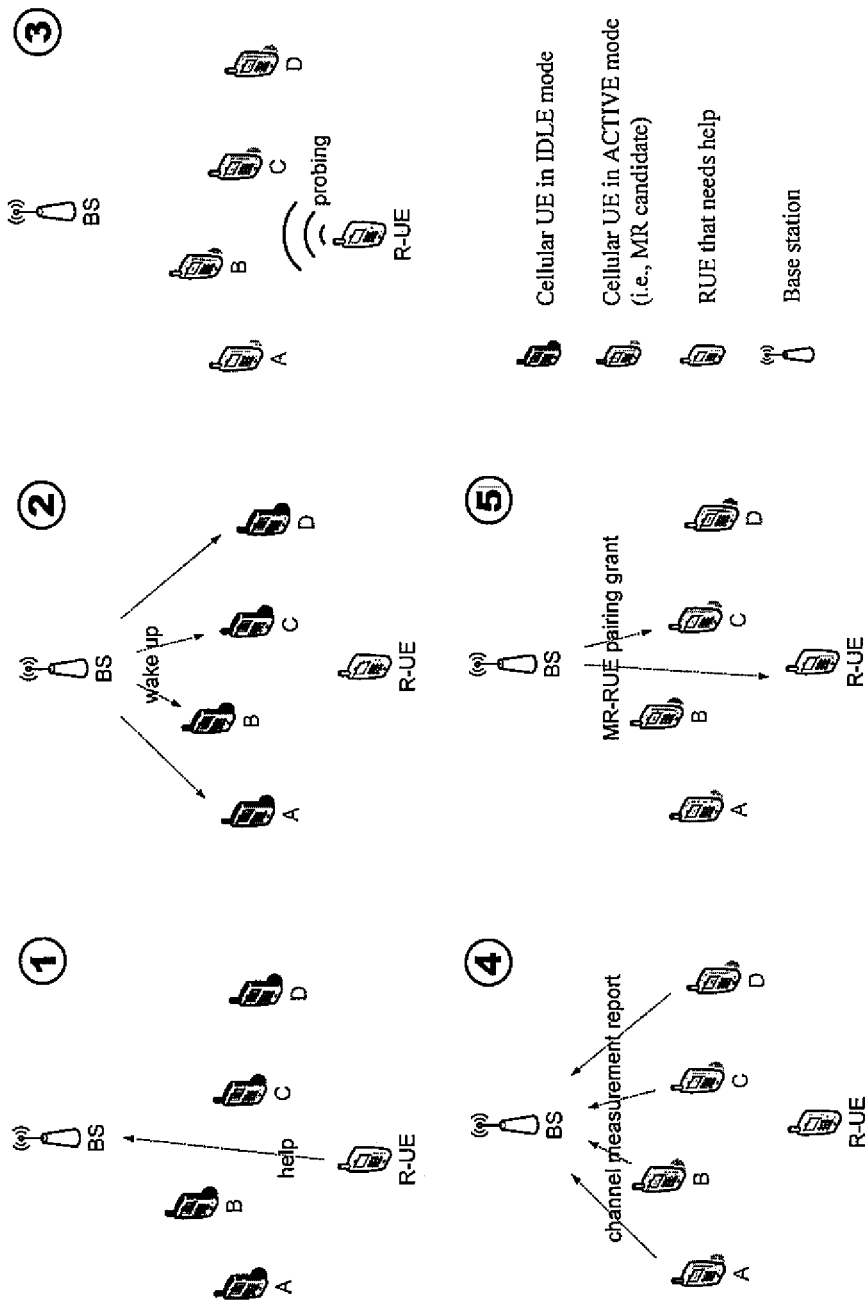
FIG. 1 is a schematic diagram in five panels summarizing the pairing of a RUE with an MR according to various conventional relaying techniques.

As an overview, exemplary embodiments of this invention pre-deploy nodes in the cell as the MRs, regardless of any specific desire or need by any RUE for relayed communications (as in the help query at FIG. 1). In a specific embodiment, in view of the signaling overhead concern above nodes are selected by the BS to be MRs in a manner that ensures that any two of the deployed MRs are not too close to one another. In contrast, the conventional scheme shown at FIG. 1 is event-triggered, where the MR is selected in response to the request by the RUE, and possibly also using some location information and/or random selection (for example if multiple MRs have a path with the RUE that satisfies the conventional path selection criteria for pairing).

In an exemplary embodiment the BS knows which of the UEs in its cell are available for use as MRs based on a report by the individual UEs themselves. This may be a required report upon entry into the cell, or a periodic report that each UE sends with a measurement report or some other control signaling. By example this may be as small as a single bit indicating whether or not the UE sending that bit is willing to act as a relay. As will be detailed below, exemplary embodiments of the invention deploy a new uplink control channel for this purpose.

The BS selects which UEs will be the MRs from those indications of willingness to act as relays, and its selection is also based on location information of the UEs that send those indications. This assures that no two UEs selected as MRs are too close, which reduces inefficient control signaling as will be detailed below. In an exemplary embodiment the BS responds to the respective UEs which send a willingness indicator with either an approval to be a MR, a denial to be a MR, or a request for further information (for example, location information, channel quality measurement information, etc.). The three response options in this embodiment can be signaled on a downlink channel with as few as two control bits. As will be detailed below, exemplary embodiments of the invention deploy a new downlink control channel for this purpose.

Figure 2:
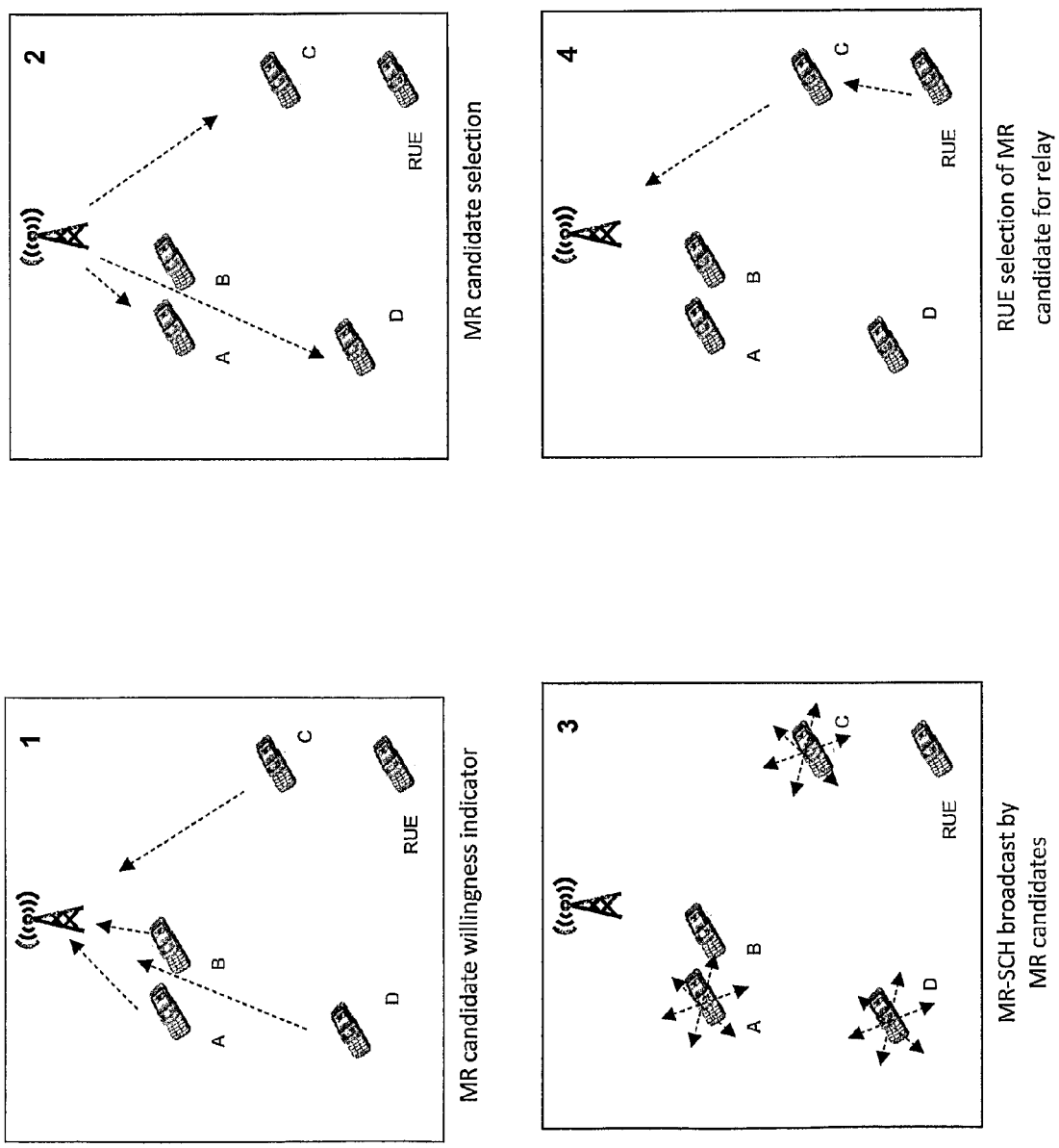
FIG. 2 is similar to FIG. 1 but in four panels and showing an exemplary process by which MRs are selected for potential use as a relay by a RUE according to an exemplary embodiment of the invention.

The above are summarized at FIG. 2 in which there are mobile UEs A through D in the cell controlled by a single BS, and a RUE which does not become relevant until panel 4 of FIG. 2. At panel 1 of FIG. 2 there is a plurality of UEs A through D in the cell, each of which sends to the BS an indicator that the respective UE is willing to act as a MR. Note that UEs A and B are located in close proximity to one another, whereas UEs C and D are spaced some substantial distance from one another and from the cluster of UEs A and B. By panel 1 of FIG. 2 UEs A though D are voluntary MR candidates.

There may be additional UEs in the cell that are unwilling to act as MRs and who send to the BS an indication of that unwillingness, but such additional UEs are not shown at FIG. 2 since they are not relevant once they've indicated their unwillingness. An exception lies in emergency services (for example, a RUE sends an emergency call or beacon), in which according to an exemplary embodiment of the invention a UE's indicator of unwillingness to act as relay may be disregarded by the BS which then directs the respective UE to take on the functions of a MR for a specified period of time or for a specified RUE.

At panel 2 of FIG. 2 the BS makes its selection as to which of the willing UEs A through D will be MRs. Since UEs A and B are close to one another the BS selects only one of them. The subset of the whole plurality of relay-willing UEs in the cell which the BS selects as the MRs is then UEs A, C and D in this example. The BS indicates to them via the responses shown at panel 2 of FIG. 2 that they are selected. Not shown at panel 2 of FIG. 2 is the response from the BS to UE B that it is not selected as a MR.

Different conditions in the cell may impose different criteria on the BS as to how far apart the UEs should be which are selected as the MR candidates. Some cells may have closely spaced tall buildings that strongly impact channel conditions and so a shorter distance between MR candidates is a more optimal solution as compared to a suburban cell with low lying and spaced apart building. Some BSs might not impose a simple distance regimen across the entire cell. For example, if there is a chronic dropping of calls at one location in the cell such as due to shadowing by a building, the BS may learn that chronic problem and allow a first MR candidate at a position to cover the building shadow while allowing a second MR candidate to be fairly close to the first but covering the non-shadowed side of the building, despite all other MR candidates in the cell being spaced much further from one another. Variances such as these are expected to be relatively rare and short-lived, until the network operator can deploy a fixed relay to address the shadowing issue in the above example.

At panel 3 of FIG. 2 those UEs who received the positive response from the BS then periodically send a beacon advertising that the respective UE is a MR. Note that everything in panels 1 through 3 of FIG. 2 is independent of any RUE sending a query for a relay or a help message, which was the condition precedent at FIG. 1 for relay pairing. This means that according to the exemplary embodiment at FIG. 2 the BS selects the subset of relay-willing UEs in the cell regardless of any RUE; there can exist in the cell the constellation of MRs even if there is no RUE in the cell and no relay of communications ongoing.

The MRs are distinguished from other UEs in the cell in that the MRs have been configured as such by the BS. In the FIG. 2 example that configuring is evidenced at panel 2 by the positive response messages and at panel 3 by the broadcasts indicating the broadcasting UEs are MRs that are ready/approved for relay in the cell. Prior to panel 4 of FIG. 2 there is no active relay of any communications in the cell and no request for relay or help in the cell. The RUE heard the broadcasts at panel 3 of FIG. 2 and found that UE C had the strongest signal, and so the RUE chooses UE C as the relay for its communications at panel 4 and UE C relays uplink traffic from the RUE to the BS (and similarly relays downlink traffic from the BS to the RUE).

Figure 3A:
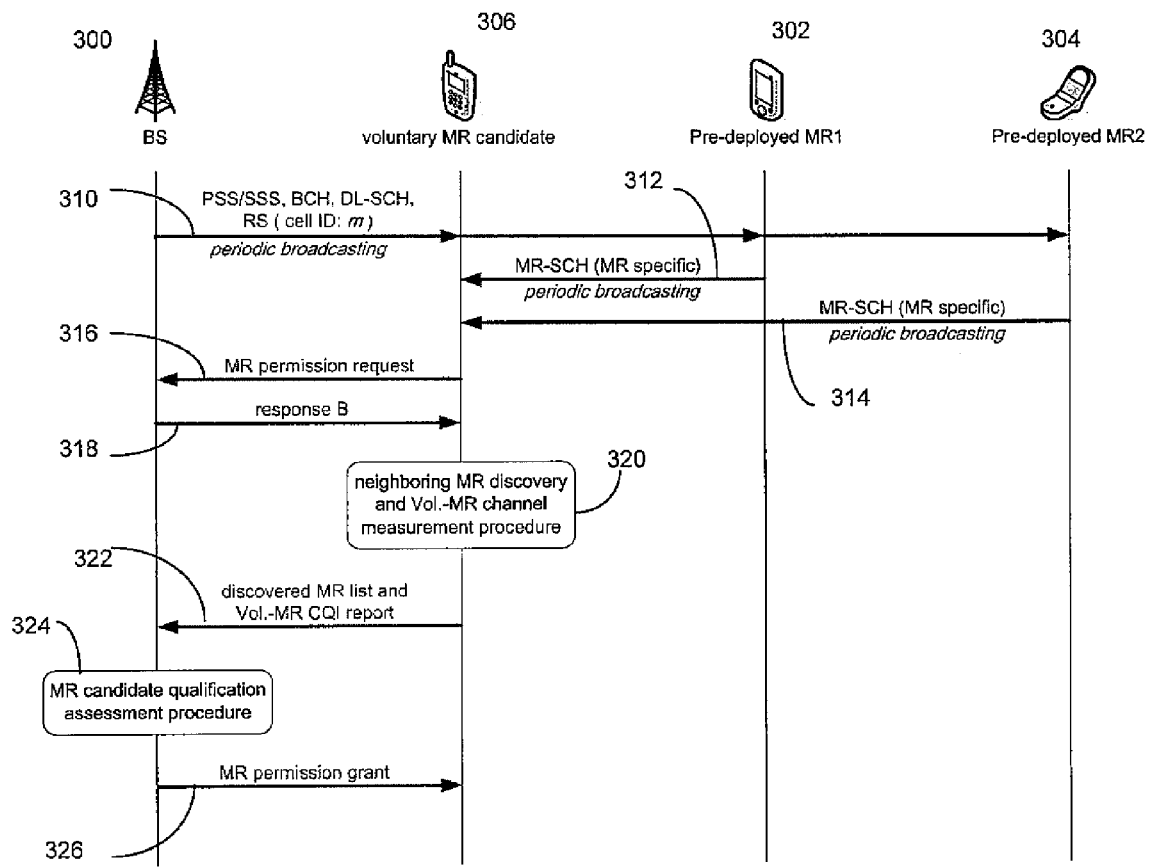
FIG. 3A is a signaling diagram illustrating exchanges by which a user terminal becomes selected as a new MR to join two other already-selected MRs according to an exemplary embodiment of the invention.

In an exemplary embodiment the BS will continually maintain the constellation of pre-deployed MRs in the cell. FIG. 3A is a signaling diagram illustrating an exemplary embodiment that is chronological from top to bottom in which there are two UEs 302, 304 already pre-deployed as MRs in the cell, and a third UE 306 which the BS 300 considers for adding to the pre-deployed subset of UEs in the cell which are configured as MRs.

As an initial matter the BS periodically broadcasts 310 its information in the cell, shown by example at FIG. 3A as broadcasts of primary synchronization signal PSS and/or secondary synchronization signal SSS and/or cell identifier ID on a broadcast channel BCH or other downlink shared channel DL-SCH. Being a broadcast signal, all the UEs in the cell and near the cell are able to hear it.

Being previously configured as MRs, the two UEs 302 and 304 also broadcast periodically their own information advertising that they are MRs. This is shown by respective messages 312 and 314, and by example there is a mobile relay shared channel MR-SCH on which any user and the BS can hear these MR-broadcasts 312, 314. In an embodiment the BS chronologically spaces the broadcasts on the MR-SCH in the cell by the different MRs, for example by giving them a time slot with the response indicating the UE is approved as a MR.

Now at FIG. 3A there is a cellular UE 306 which currently has the willingness to be a MR and which indicates this willingness by sending to the BS a request 316 which effectively indicates: "I want to be a MR. Do you agree?" Here the UE 306 that wants to be an MR is denoted as voluntary MR candidate.

By example, once the BS 300 receives the MR permission request 316, the possible responses of the BS 300 are in an embodiment any of the following options.

a) "OK, you can be a MR." This is used by example if there is currently no MR deployed in the cell (in which case channel measurements are irrelevant to the BS)

b) "Please measure the channel with all other pre-deployed MRs in the cell." This response is for example for the more common case illustrated at FIG. 3A in which some MRs have been pre-deployed but the BS still thinks the network is not well- or optimally-deployed (the BS thinks additional MRs is/are needed).

c) "No, you cannot be a MR." This response is for example appropriate in either of two instances. First, the BS thinks that currently the network is been well-deployed which means that are enough MRs that are pre-deployed and that most or all of those MRs are at the proper location (and maybe each MR has at least one BACKUP MR as will be detailed below), so that no more MR is needed currently. Second, the BS thinks that the requesting UE currently is not qualified to be a MR, (for example, there is some BS-UE channel quality deterioration due to mobility, or there is sufficient traffic incoming to the requesting UE 306 that would prevent it from being a good relay).

When UE 306 gets the response a) from the BS 300, it becomes an IDLE MR. Here "IDLE MR" means this UE has been pre-deployed as an MR by the BS and it has all the functionality of a MR (for example, broadcasting its MR advertisement periodically). But as at panel 3 of FIG. 2 the IDLE MR is only on standby for relaying, and it has no actual traffic to relay until it is discovered by some RUE which is done only at panel 4 of FIG. 2. The IDLE MR is always ready and waiting for the incoming request from an RUE for traffic relaying. Once there is some RUE nearby which requests relaying by the IDLE MR, this IDLE MR thus has traffic to relay, and it becomes an ACTIVE MR and then performs the job of traffic relaying for the RUE.

Note that in the above example only one IDLE MR per relay hop comes out of its idle state for relay purposes (by becoming an ACTIVE MR), whereas in the approach of FIG. 1 all the MR candidates are awakened by the BS so they may all listen for the RUE's request. The examples at FIGS. 1-2 illustrate a one-hop relay, but exemplary embodiments of this invention are readily extended to multi-hop relays by having the ACTIVE MR nearest the RUE (termed a first multi-hop MR) then find the next MR in the multi-hop similar to how the RUE found that first multi-hop MR for the first hop uplink from the RUE. Or alternatively, since such a first multi-hop MR is already in need of its own MR for its own traffic, the first multi-hop MR may have already discovered the next multi-hop MR for relaying the RUE traffic when it settled on which MR to use for relaying its own traffic.

Returning to FIG. 3A, when the requesting UE 306 gets the response b) above from the BS 300, it should measure the channel quality of the links connecting itself and all the pre-deployed MRs 302, 304 (includes all the IDLE MRs and all the ACTIVE MRs) by using the probing signal that is periodically broadcast 312, 314 by each pre-deployed MR 302, 304. This is shown at block 320 of FIG. 3A.

For the case in which all the measured channel qualities are not good (for example, the channel quality indicator CQI is less than a predefined threshold), then requesting UE 306 should send to the BS a message which implies that "I can be a MR because all the pre-deployed MRs are far away from me." In an embodiment this message can be as little as one bit.

For the case in which more than one of the channel qualities are good (CQI>threshold) and the rest of other channel qualities are not good (CQI<threshold), in an exemplary embodiment the requesting UE 306 then sends to the BS 300 the identification of one or more than one pre-deployed MR, which implies that "I can be a BACKUP MR because I am close to the specific pre-deployed MRs". This is shown at FIG. 3A by message 322 which has a MR list and the requesting UE's 306 CQI report. The number of MR identifications which are fed back here may in one embodiment be limited to a pre-determined number to control signaling overhead, or it may be flexibly defined by BS.

In an exemplary embodiment, based on the report 322 that the BS receives from the requesting UE 306, together with traffic load, the BS 300 then makes a decision 324 whether this UE 306 can be granted to be an IDLE MR or BACKUP MR. Then the BS 300 informs the requesting UE 306 of the decision via downlink signaling 326.

The information of all of the BACKUP MRs are recorded by the BS 300 in its local memory for future use. For example, if one or more of the pre-deployed MRs 302, 304 cannot or is not willing to act as an MR, and simultaneously the formal BACKUP MR cannot act as a MR either. Such cases might arise for example due to mobility of a MR 302, 304 to another cell or an inability to fulfill the QoS requirements of the RUE due to too high traffic demand on the MR 302, 304. Then this UE that is memorized by the BS 300 can act as a MR or as another BACKUP MR, which the BS can in an embodiment initiate as a regular MR (the BS 300 will initiate it as an IDLE MR).

In an embodiment the BS's decision at block 324 of FIG. 3A follows two principles. First, if the voluntary MR candidate 306 is very close to any of the pre-deployed MRs 302, 304 (for example, if the CQI for one is very high), the BS should deny the request 316. This is because crowding multiple MRs into a small area is a waste of radio resources and so should be avoided. Second, if there is one pre-deployed MR 302, 304 whose traffic or request for relay is too busy, the corresponding BACKUP MR should be given high priority to be an IDLE MR. This priority allowance is a means by which the geographic distribution of deployed MRs in a cell can adapt well to the actual traffic load of the cell.

Note that the BACKUP MR is not a pre-deployed MR. The distinction of the BACKUP MR over other relay-unwilling UEs in the cell is that the BS 300 has already known that node's willingness to be a MR and also knows that this node has a good connection with one or two certain ACTIVE MRs. When the relaying traffic of this ACTIVE MR is too heavy or the ACTIVE MR quit the relaying job intentionally, the BACKUP MR nearby may be informed by the BS to become an ACTIVE MR.

For clarity, pre-deployed MRs 302, 304 at FIG. 3A may each be either an IDLE MR or an ACTIVE MR. The terminologies of PSS/SSS, BCH, DL-SCH, RS, CQI are all in line with the LTE/LTE-A standard though embodiments of this invention are not limited only to modifications of those radio standards. The MR-SCH represents the MR-specific probing signal which is periodically broadcast by each pre-deployed MR 302, 304.

There are at least two purposes for the MR periodic broadcasting probing signal 312, 314. First, for channel measurement 320 between the voluntary MR candidate 306 and the pre-deployed MRs 302, 304. Second, for any RUE to discover one or more MR 302, 304 and then enter into the cellular network via the MR 302, 304 (if needed).

Figure 3B:
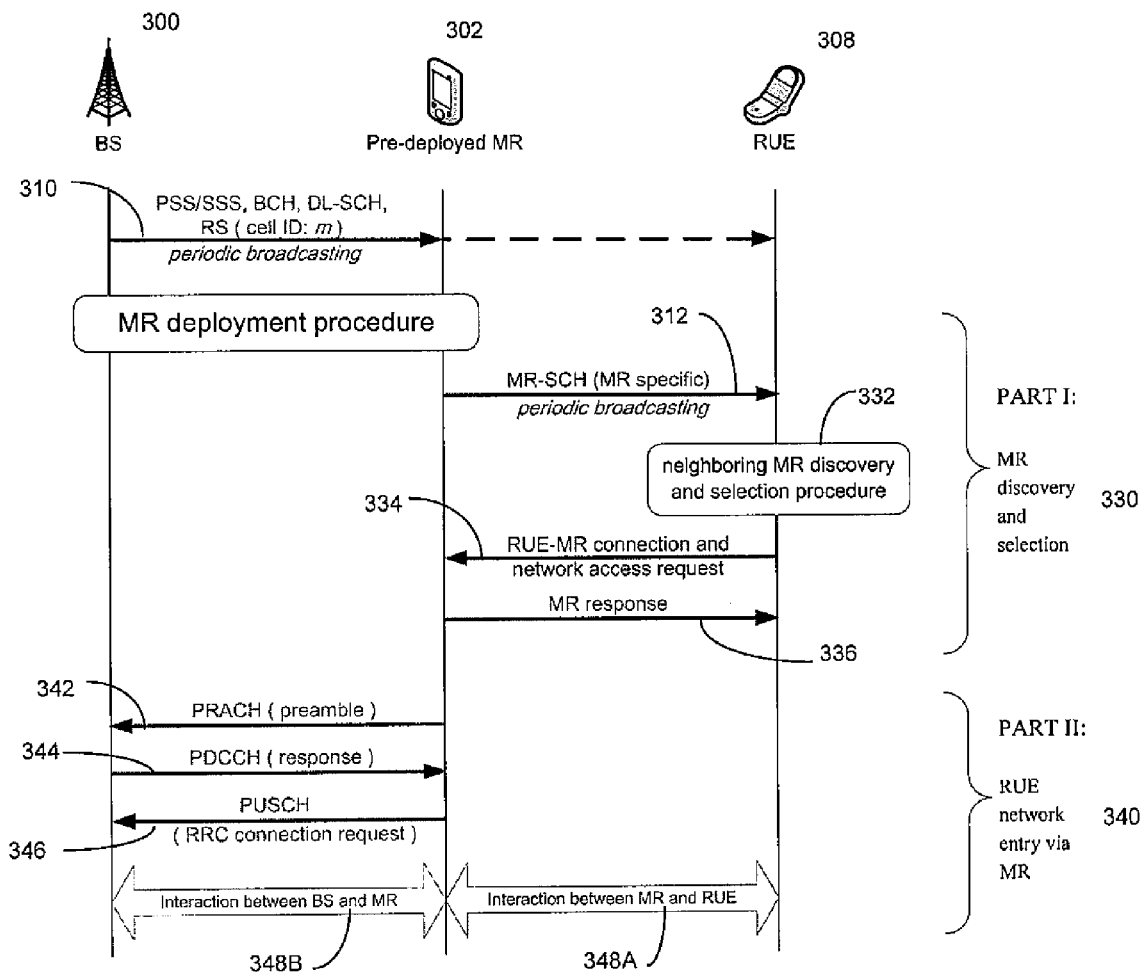
FIG. 3B is a signaling diagram illustrating exchanges by which a relay user terminal selects an MR for relay communications with a BS according to an exemplary embodiment of the invention.

FIG. 3B is a signaling diagram illustrating an exemplary embodiment of the invention by which a RUE 308 discovers a pre-deployed MR 302 for the specific purpose of establishing a connection with the network. The RUE can also access a MR for other purposes, such as to maintain a connection with the network as the RUE's signal fades or if increased throughput to/from the RUE is needed. The RUE processes at FIG. 3B are fully compatible with the MR auto-deployment approach detailed at FIG. 3A. Like reference numbers represent like elements and will not be described again.

At FIG. 3B the RUE's actions can be generally divided into two parts: a first part 330 that includes MR discovery and selection; and a second part 340 that includes network entry of the RUE via the MR. The first part 330 is relevant for the case in which the RUE retains coverage directly with the BS 300, considered as the RUE being inside the coverage area of the BS. This may occur for example where the MR is being used to increase throughput to/from the RUE. Both the first part 330 and the second part 340 are relevant for the case in which the RUE is outside the coverage area of the BS and there is no direct wireless link between them. This may occur for example when an already-connected RUE moves into an area of a cell covered only by a relay, such as for example the shadowed building example noted above or where the lateral extent of a BS coverage is extended by one or more relays and the RUE enters the cell in that area or moves toward that area after being already connected.

The RUE 306 at FIG. 3B listens for the MR-SCH messages 312 and selects one at 332 which has a good signal strength. The RUE 306 sends a connection and network access request 334 to establish itself on the network, to which the MR 302 sends a response 336. Then at part two 340 the MR 302 establishes the connection with the BS 300 on behalf of the RUE 308. In the specific embodiment of FIG. 3B the MR 302 sends a primary random access channel PRACH request (a message preamble) at 342 to which the BS 300 sends a response 344 on a physical downlink control channel PDCCH which is mapped by the PRACH 342. The MR 302 then sends a connection request 346 for the RUE 308 and identifying the RUE 306 on a physical uplink shared channel PUSCH that is scheduled on the PDCCH. The BS 300 exchanges user data with the MR on a bidirectional link 348B and the MR exchanges user data with the RUE 308 on another bidirectional link 348A to form a relay between the RUE 308 and the BS 300. The BS 300 and the RUE 308 may also include control signaling on those bidirectional links 348A-B.

Following is an analysis of signaling overhead for the exemplary embodiment of FIG. 3A-B as compared to the conventional approach summarized at FIG. 1, using terms and assumptions according to the following table:

| Variable | Description | Exemplary Value |
|---|---|---|
| StatTrans | Overhead for each MR candidate changing its mode form IDLE to ACTIVE | 200 bits |
| K | Average number of MR candidate awaken by BS for every times of MR-RUE pairing in case that BS has no geographic knowledge of every cellular UE | 200 |
| k | Average number of MR candidate awaken by BS for every times of MR-RUE pairing in case that BS has geographic knowledge of every cellular UE | 10 |
| GeoInfo | Overhead for cellular UE reporting its geographic info. | 5 bit/second |
| N | Number of cellular UE in the cell | 200 |
| Syn | Overhead for RUE sending the probing signal | 63 symbols |
| CQI | Overhead for MR-candidate CQI reporting | 5 bits |
| $P_R$ | Arriving rate of the RUE request in the cell | 5 Hz |
| t | Time variable | |

The conventional approach of FIG. 1 are reflected by equation [1-a] through [1-c] for the various scenarios at the second bullet at the final paragraph of the background section above. Specifically, the case that nearly ALL the UEs in the cell are signaled to receive RUE probing is reflected by equation [1-a]:

$$\text{overhead}_1 = [\text{StatTrans} \cdot K + \text{Syn} + \text{CQI} \cdot K] \cdot P_R \cdot t \qquad [1\text{-a}]$$

The case that only UEs that are CLOSE to the RUE are signaled to be MR-candidates is reflected by equation [1-b]:

$$\text{overhead}_1 = [\text{StatTrans} \cdot k + \text{Syn} + \text{CQI} \cdot k] \cdot P_R \cdot t + \text{GeoInfo} \cdot N \cdot t \qquad [1\text{-b}]$$

The case that a fixed number of UEs in the cell are RANDOMLY selected to be MR-candidates is reflected by equation [1-c]:

$$\text{overhead}_3 = [\text{StatTrans} \cdot k + \text{Syn} + \text{CQI} \cdot k] \cdot P_R \cdot t \qquad [1\text{-c}]$$

Observing equations [1-a], [1-b] and [1-c], leads to the following conclusions:
1) Terms of StatTrans, Syn and CQI are multiplied by $P_R \cdot t$, which means that these three kinds of overhead increase with time and the increasing rate highly depends on $P_R$.
2) StatTrans is the most significant overhead among the three terms in all the equations and it is multiplied by K or k, which means that the more MR candidates are awakened the more dramatic is the increase of overhead. In case of equation [1-a], the BS does not have exact geographic knowledge of each cellular UE. In order to ensure that for each times of request RUE can find a suitable MR, K should be a very large number (for example, nearly all of the idle UEs in cell), which causes a very high signaling overhead. In case of equation [1-b], the UEs in the cell should frequently report its geographic information to the BS, then K (large number) could be reduced to k (small number). But periodical geographic information reporting is also a heavy signaling overhead burden (for example, GeoInfo·N·t). In case of equation [1-c], there is no geographic information reporting, the total number of MR candidates is fixed to be k and the MR candidates are selected in a random way. Although the overhead is low, there is no guarantee that the channel between the RUE and the MR-candidate is good, and additionally the selected UE might be not willing to act as an MR and so it cannot be assumed that there is a high probability of successfully pairing a RUE with a MR.
3) Since there are multiple MR candidates awakened to receive the probing signal from the RUE, multiple CQIs should be reported, which results in CQI multiplied by K or k. As the consequence, the overhead increases with time very fast.

Now putting the exemplary values from the above table into equations [1-a], [1-b] and [1-c], yields the following respective overhead:

$$\text{overhead}_1 = [200 \times 200 + 63 + 5 \times 200] \times 5 \times t = 205315 \times t$$

$$\text{overhead}_2 = [200 \times 10 + 63 + 5 \times 10] \times 5 \times t + 5 \times 200 \times t = 11565 \times t$$

$$\text{overhead}_3 = [200 \times 10 + 63 + 5 \times 10] \times 5 \times t = 10565 \times t$$

This compares with the exemplary embodiment of the invention that is detailed above with respect to FIGS. 3A-B:

$$\text{overhead} = RDC \cdot M + \frac{Syn}{T_s} \cdot M \cdot t + CQI \cdot P_R \cdot t \qquad [2]$$

where:

| Variable | Description | Exemplary Value |
|---|---|---|
| RDC | Average overhead for deploying a single MR | 10 bits |
| M | Total number of deployed-MR in the cell | 10 |
| $T_s$ | Period of MR sending the probing signal | 100 ms |
| Syn | Overhead of the probing signal for every times of MR sending | 63 symbols |

| Variable | Description | Exemplary Value |
|---|---|---|
| CQI | Overhead for RUE CQI reporting | 5 bits |
| $P_R$ | Arriving rate of the RUE request in the cell | 5 Hz |
| t | Time variable | |

Observing equation [2] leads to the following conclusions:
1) RDC·M is the overhead cost of deploying MR in cells. Although it is an extra overhead as compared to equation [1], this overhead does not increase with time, which means that it can be offset paid for (offset) once for all.
2) There are only two terms that increase with time, in which $$\frac{Syn}{T_s} \cdot M \cdot t$$

is more important because it actually determines how much and how fast the total overhead increases with time. Note that this part of overhead is totally controllable by adjusting the value of $T_s$ and M. For example, one can lengthen $T_s$ when overhead is high and can increase M when an RUE request is busy. On the contrary, in the conventional scheme K (geographic info. related) is very hard to control, so the overhead may fluctuate and also be unpredictable.

3) $CQI \cdot P_R \cdot t$ is related to the arriving rate of the RUE request and also increases with time. However, since the MR selection procedure can be done at the RUE in an exemplary embodiment of the invention (see FIG. 3B), only one or a small amount of CQI is fed back to the BS. Therefore the overhead caused by this term can be ignored as compared with $StatTrans \cdot K \cdot P_R \cdot t$ and $CQI \cdot K \cdot P_R \cdot t$ in the equation [1]. This feature makes the total overhead of the exemplary embodiment of this invention increase much slower than that in the conventional scheme.

Putting the same exemplary values from the above table into equation [2] yields the following respective overhead:

$$\text{overhead} = 10 \times 10 + \frac{63}{0.1} \times 10 \times t + 5 \times 5 \times t = 100 + 6325 \times t$$

In the beginning, due to MR deployment related cost the overall overhead of the exemplary embodiment of the invention is greater than that of the conventional approach. But with the lapse of time, the overall overhead of the exemplary embodiment increases very slowly by reason of a low amount of CQI reporting, whereas the overhead of the conventional scheme increases very fast because many MR candidates are awakened and all of them shift their mode from IDLE to ACTIVE. Therefore, in the long run the exemplary embodiment is better than the conventional approach in terms of system overhead reduction.

Various ones of the exemplary embodiments detailed above provide one or more of the following technical benefits. First, the RUE does not have to send a help request to the BS directly. It can measure the periodic broadcasting signal sent by a pre-deployed MR. This feature makes possible that the MR can be used when the RUE has a relatively bad direct link with the BS and/or the RUE is in blind area. By contrast, the conventional approach of FIG. 1 requires the direct connection be setup between the BS and the RUE.

Second, in the conventional approach such as FIG. 1, many MR candidates should be awakened to receive a RUE's probing signal, based on geographic information at the BS. As was shown the overhead of downlink signaling and interaction between BS and MR candidate for this mode shift from IDLE to ACTIVE are very large. In addition, MR candidates awakened randomly or based on geographic information cannot assure there will be a good enough MR-RUE channel quality; and further cannot assure with a high probability that there will be a successful MR-RUE pairing because some of MR candidates may not want to be a MR. Additionally, geographic information implies also a heavy signaling overhead burden. To the contrary, according to exemplary embodiments of the invention the MR deployment is totally under the control of the BS by the mechanism of "request and grant" shown by example at FIG. 3A. All the pre-deployed MRs have indicated a willingness to be an MR, which better assures there will be a successful pairing of RUE with MR. Importantly, due to less CQI reporting and fewer MR candidates the overhead of these exemplary embodiments is less than that of the conventional one shown at FIG. 1, at least after some time period has elapsed as shown in the above quantitative analysis of overhead.

Third, in the exemplary embodiments the BS can optimize the number of MRs and the geographic distribution of MR, based on channel measurements between MR candidates and pre-deployed MRs and also on traffic load. A better MR distribution in the cell means a higher efficiency of MR usage, a higher throughput gain and a lower MR deployment cost.

Fourth, the BACKUP MR concept enables the wireless network to be more robust and easy to maintain. For example, such a robust network can solve problems such as an overloaded pre-deployed MR by switching it off as a relay and switching to the BACKUP MR. The CQI information for the BACKUP MR is known in advance at the BS and so cost of having BACKUP MRs is very low and they can be quickly deployed. Reverting an overburdened MR from an MR role to only a non-MR UE role enables it to handle only its own traffic.

Figure 4A:
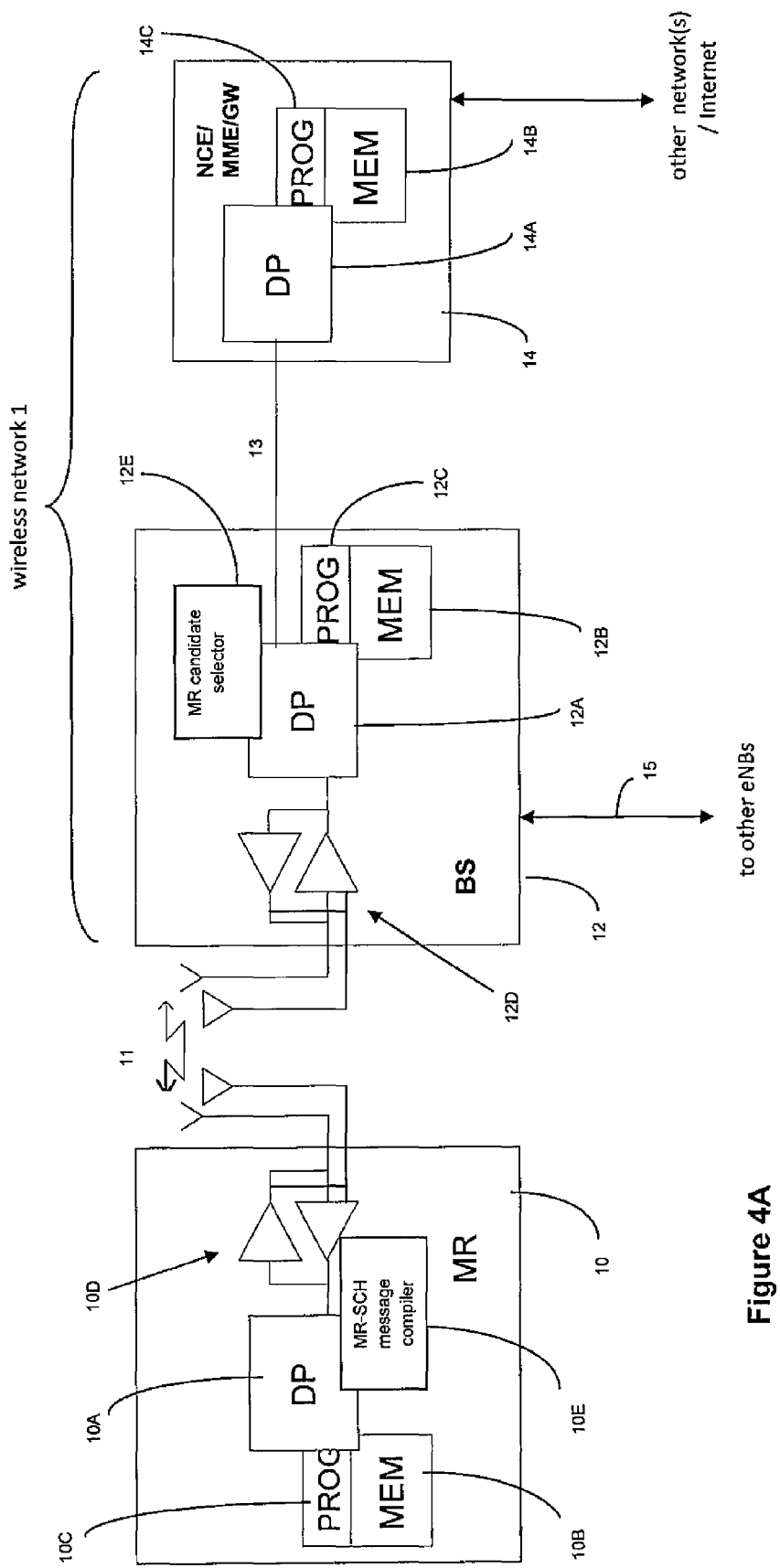
FIG. 4A shows a simplified block diagram of various electronic devices that are suitable for use in practicing the exemplary embodiments of this invention.

Reference is now made to FIG. 4A for illustrating a simplified block diagram of various electronic devices and apparatus that are suitable for use in practicing the exemplary embodiments of this invention. In FIG. 4A a wireless network 1 is adapted for communication over a wireless link 11 with an apparatus, such as a mobile communication device which may be referred to as a UE 10 and which will become a MR in the cell as detailed above. On the network side the link 11 goes to and from a network access node, such as a Node B (base station), and more specifically an eNB 12. There may be other relays, either fixed or MRs, along the link between the eNB 12 and the MR 10. Not shown is the further link between an RUE and the MR 10. The network 1 may include a network control element (NCE) 14 that may include mobility management and/or serving gateway MME/GW functionality, and which provides connectivity with another network, such as a telephone network and/or a data communications network (e.g., the internet).

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as an S1 interface according to EUTRAN (evolved universal terrestrial radio access network, also known as long term evolution LTE or UTRAN). The eNB 12 may also be coupled to another eNB via a data/control path 15, which may be implemented as an X2 interface.

At least one of the PROGs 10C and 12C is assumed to include program instructions that, when executed by the associated DP, enable the device to operate in accordance with the exemplary embodiments of this invention, as was detailed fully above.

That is, the exemplary embodiments of this invention may be implemented at least in part by computer software executable by the DP 10A of the UE/MR 10 and/or by the DP 12A of the eNB/BS 12, or by hardware, or by a combination of software and hardware (and firmware).

For the purposes of describing the exemplary embodiments of this invention the UE 10 may be assumed to also include a MR-SCH message compiler 10E which puts together the broadcast advertisements that the UE is acting as a MR in the cell as detailed above with respect to FIG. 3A. The eNB 12 may include a MR candidate selector 12E which analyzes the CAI reports sent in by voluntary MR candidates and decides which ones will become a part of the subset of UEs in the cell which are MRs.

In general, the various embodiments of the UE/MR 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 4B:
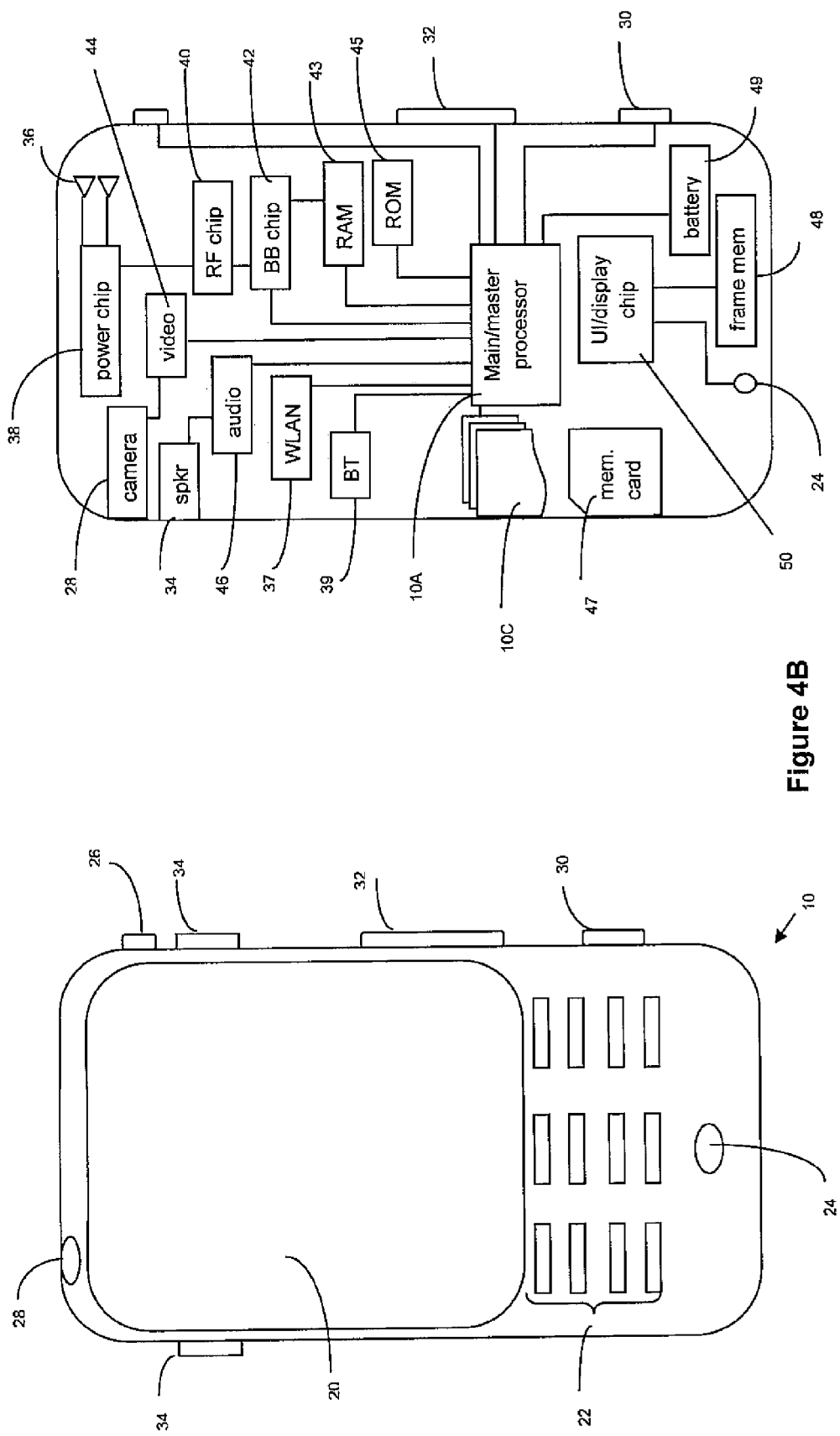
FIG. 4B shows a more particularized block diagram of a user equipment such as that shown at FIG. 4A, which can be employed as a MR and/or as a relay UE according to an exemplary embodiment of the invention.

FIG. 4B illustrates further detail of an exemplary UE/MR in both plan view (left) and sectional view (right), and the invention may be embodied in one or some combination of those more function-specific components. At FIG. 4B the UE/MR 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE/MR 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 4B are seen multiple transmit/receive antennas 36 that are typically used for cellular communication. The antennas 36 may be multi-band for use with other radios in the UE. There is a power chip 38 that controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE/MR 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. Embodiments of this invention may be practiced by the main DP 10A, by a dedicated processor 10E, or by some combination of processors, memory, circuitry and the like. It is noted that in some embodiments the relevant functionality may be disposed across various chips and memories as shown or disposed within another processor that combines some of the functions described above for FIG. 4B. Any or all of these various processors of FIG. 4B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 4B.

Note that the various chips (e.g., 38, 40, 42, etc.) that were described above may be combined into a fewer number than described and, in a most compact case, may all be embodied physically within a single chip.

Figure 5A:
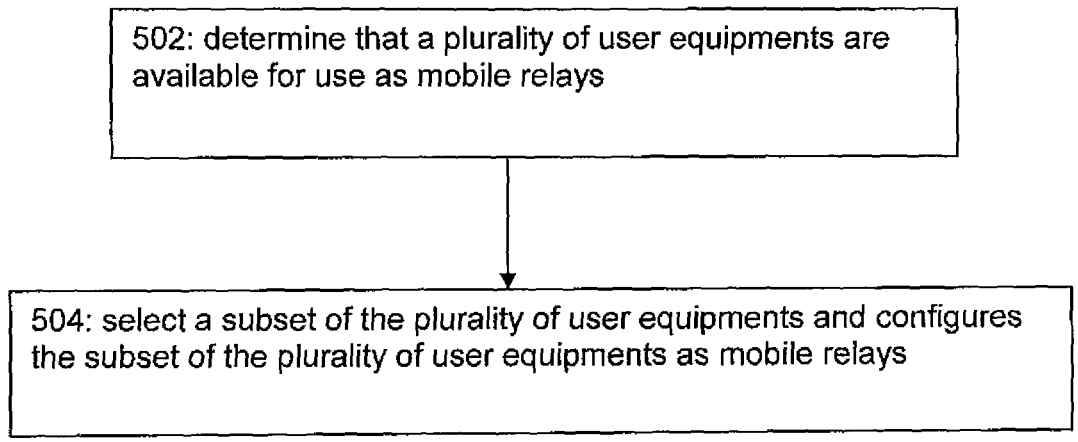
FIGS. 5A-B are logic flow diagrams that illustrate the operation of methods, and a result of execution of computer program instructions embodied on computer readable memories, in accordance with the exemplary embodiments of this invention from the perspective of the BS and the MR, respectively.

FIG. 5A is a logic flow diagram that illustrates the operation of a method, and a result of execution of computer program instructions, in accordance with the exemplary embodiments of this invention such as for example from the perspective of the BS. In accordance with these exemplary embodiments at block 502 the BS determines that a plurality of user equipments are available for use as mobile relays; and at block 504 the BS selects a subset of the plurality of user equipments and configures the subset of the plurality of user equipments as mobile relays.

In one non-limiting example the selecting is independent of any relay user equipment needing or requesting relay service. In another non-limiting example the subset of the plurality of user equipments are selected such that each user equipment of the subset is spaced a distance from every other user equipments within the subset, in which the distance from every other user equipments within the subset is implied from channel quality indications the BS receives from at least some of the user equipments within the subset.

In a further non-limiting example the determining at block 502 comprises the BS receiving from each of the plurality of user equipments an indication that the user equipment is willing to operate as a mobile relay. In a particular embodiment of that the indication is received from each of the plurality of user equipments in the absence of a message requesting the indication.

In a still further non-limiting example, configuring the subset of the plurality user equipments as mobile relays comprises sending to each respective user equipment from which an indication was received a respective reply to the received indication, each respective reply comprising at least one of: an indication that the respective user equipment is selected to be a mobile relay; a request for additional information; and an indication that the respective user equipment is not selected to be a mobile relay.

Each user equipment from which is received the indication indicating willingness to operate as a mobile relay may be considered a volunteer mobile relay candidate as in the detailed description above. In this case, in an exemplary embodiment the plurality of user equipments of block 502 consists of all volunteer mobile relay candidates in a cell; and the subset of the plurality of user equipments at block 504 consists of all user equipments that are active mobile relays in the cell. Note that as described above 'active' does not imply actively relaying communications but that the UE is selected as a pre-configured/pre-deployed MR (not a backup MR). Using the specific classifications of the exemplary embodiment detailed above with respect to FIGS. 2 and 3A, the volunteer mobile relay candidates comprise backup mobile relays and active mobile relays and volunteer mobile relay candidates which have been rejected for use as an active mobile relay in the cell.

Figure 5B:
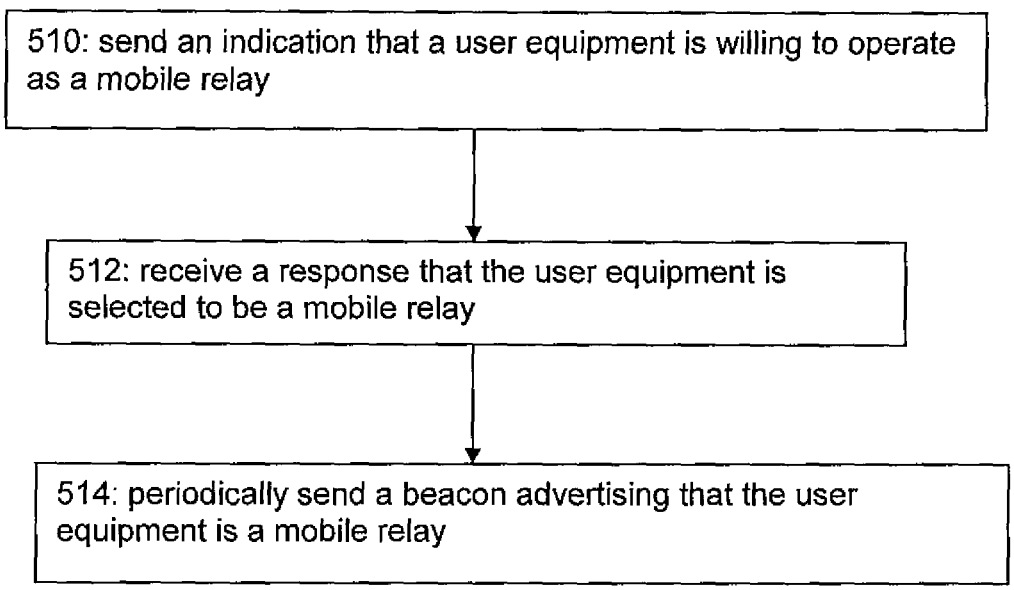

FIG. 5B is a logic flow diagram that illustrates the operation of a method, and a result of execution of computer program instructions, in accordance with the exemplary embodiments of this invention such as for example from the perspective of the UE which becomes a MR. In accordance with these exemplary embodiments at block 510 the UE sends an indication that a user equipment is willing to operate as a mobile relay; at block 512 it receives a response that the user equipment is selected to be a mobile relay; and at lock 514 it periodically sends a beacon advertising that the user equipment is a mobile relay.

In one non-limiting example the beacon is periodically sent independently of any relay user equipment needing or requesting relay service. In another non-limiting example the indication of block 510 is sent in the absence of any received message requesting the indication.

In a still further non-limiting example the UE further receives a response to the indication requesting that the user equipment measure a channel with other mobile relays; and the UE measures a channel with other mobile relays and reports channel measurement results to a base station. In this example the response at block 512 that the user equipment is selected to be a mobile relay is received in response to reporting the channel measurement results.

The various blocks shown in FIGS. 5A-B may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   determining at a base station that a plurality of user equipments are available for use as mobile relays; and
   selecting a subset of the plurality of user equipments and configuring the subset of the plurality of user equipments as mobile relays;

where determining that the plurality of user equipments are available for use as mobile relays comprises receiving at the base station from each of the plurality of user equipments an indication that the user equipment is willing to operate as a mobile relay, where the indication is received at the base station from each of the plurality of user equipments in the absence of a message requesting the indication.

2. The method according to claim 1, in which the selecting is independent of any relay user equipment needing or requesting relay service.

3. An apparatus comprising:
at least one processor; and
at least one memory storing a program of computer executable instructions;
in which the at least one processor is configured with the at least one memory and the computer executable instructions to cause the apparatus to perform actions comprising:
  determine at a base station that a plurality of user equipments are available for use as mobile relays; and
  select a subset of the plurality of user equipments and configure the subset of the plurality of user equipments as mobile relays;
  where determining that the plurality of user equipments are available for use as mobile relays comprises receiving at the base station from each of the plurality of user equipments an indication that the user equipment is willing to operate as a mobile relay, where the indication is received at the base station from each of the plurality of user equipments in the absence of a message requesting the indication.

4. The apparatus according to claim 3, in which the selecting is independent of any relay user equipment needing or requesting relay service.

5. The apparatus according to claim 3, in which the subset of the plurality of user equipments are selected such that each user equipment of the subset is spaced a distance from every other user equipments within the subset.

6. The apparatus according to claim 3, in which the distance from every other user equipments within the subset is implied from channel quality indications received from at least some of the user equipments within the subset.

7. The apparatus according to claim 3, in which configuring the subset of the plurality user equipments as mobile relays comprises sending to each respective user equipment from which an indication was received a respective reply to the received indication, each respective reply comprising at least one of:
  an indication that the respective user equipment is selected to be a mobile relay;
  a request for additional information; and
  an indication that the respective user equipment is not selected to be a mobile relay.

8. The apparatus according to claim 3, in which each user equipment from which is received the indication indicating willingness to operate as a mobile relay is a volunteer mobile relay candidate;
  in which the plurality of user equipments consist o fall volunteer mobile relay candidates in a cell;
  and the subset of the plurality of user equipments consist of all user equipments that are active mobile relays in the cell.

9. The apparatus according to claim 8, in which the volunteer mobile relay candidates comprise backup mobile relays and active mobile relays and volunteer mobile relay candidates which have been rejected for use as an active mobile relay in the cell.

10. A computer readable memory storing a program of computer instructions that when executed by a processor result in actions comprising:
  determining at a base station that a plurality of user equipments are available for use as mobile relays; and
  selecting a subset of the plurality of user equipments and configuring the subset of the plurality of user equipments as mobile relays;
  where determining that the plurality of user equipments are available for use as mobile relays comprises receiving at the base station from each of the plurality of user equipments an indication that the user equipment is willing to operate as a mobile relay, where the indication is received at the base station from each of the plurality of user equipments in the absence of a message requesting the indication.

11. A method, comprising:
  sending an indication to a base station that a user equipment is willing to operate as a mobile relay, the indication being sent in the absence of any received message requesting the indication and informing the base station that the user equipment is seeking permission to operate as a mobile relay in a cell associated with the base station;
  receiving a response that the user equipment is selected to be a mobile relay; and
  periodically sending a beacon advertising that the user equipment is a mobile relay.

12. The method according to claim 11, in which the beacon is periodically sent independently of any relay user equipment needing or requesting relay service.

13. An apparatus comprising:
at least one processor; and
at least one memory storing a program of computer executable instructions;
in which the at least one processor is configured with the at least one memory and the computer executable instructions to cause the apparatus to perform actions comprising:
  send an indication to a base station that a user equipment is willing to operate as a mobile relay, the indication being sent in the absence of any received message requesting the indication and informing the base station that the user equipment is seeking permission to operate as a mobile relay in a cell associated with the base station;
  receive a response that the user equipment is selected to be a mobile relay; and
  periodically send a beacon advertising that the user equipment is a mobile relay.

14. The apparatus according to claim 13, in which the beacon is periodically sent independently of any relay user equipment needing or requesting relay service.

15. The apparatus according to claim 13, in which the at least one processor is configured with the at least one memory and the computer executable instructions to cause the apparatus to perform actions further comprising:
  receive a response to the indication requesting that the user equipment measure a channel with other mobile relays; and
  measure a channel with other mobile relays and reporting channel measurement results to a base station;
  in which the response that the user equipment is selected to be a mobile relay is received in response to reporting the channel measurement results.

16. The apparatus according to claim 13, in which the indication is one bit and the response is two bits.

17. A computer readable memory storing a program of computer instructions that when executed by a processor result in actions comprising:
  sending an indication to a base station that a user equipment is willing to operate as a mobile relay, the indication being sent in the absence of any received message requesting the indication and informing the base station that the user equipment is seeking permission to operate as a mobile relay in a cell associated with the base station;
  receiving a response that the user equipment is selected to be a mobile relay; and
  periodically sending a beacon advertising that the user equipment is a mobile relay.

* * * * *

UNITED STATES PATENT AND TRADEMARK OFFICE
CERTIFICATE OF CORRECTION

PATENT NO. : 8,938,197 B2
APPLICATION NO. : 13/578753
DATED : January 20, 2015
INVENTOR(S) : Zhou et al.

It is certified that error appears in the above-identified patent and that said Letters Patent is hereby corrected as shown below:

In the claims,

Claim 8, col. 17, line 59 "o fall" should be deleted and --of all-- should be inserted.

Signed and Sealed this
Fifth Day of May, 2015

Michelle K. Lee
*Director of the United States Patent and Trademark Office*